United States Patent [19]

Klatt

[11] Patent Number: 4,713,764
[45] Date of Patent: Dec. 15, 1987

[54] TRANSMISSION CONTROL APPARATUS AND METHOD FOR VEHICLE TRAVELING UPHILL OR DOWNHILL

[75] Inventor: Alfred Klatt, Wathlingen, Fed. Rep. of Germany

[73] Assignee: WABCO Westinghouse Fahrzeugbremsen GmbH, Hanover, Fed. Rep. of Germany

[21] Appl. No.: 654,607

[22] Filed: Sep. 25, 1984

[30] Foreign Application Priority Data

Sep. 26, 1983 [DE] Fed. Rep. of Germany ....... 3334726

[51] Int. Cl.[4] ..................... B60K 41/06; B60K 41/28; G05D 13/64
[52] U.S. Cl. ............................. 364/424.1; 192/0.076; 74/866
[58] Field of Search ..................... 364/424.1; 74/866; 192/0.076

[56] References Cited

U.S. PATENT DOCUMENTS

| 4,312,249 | 1/1982 | Hau et al. ............................. 74/866 |
| 4,471,437 | 9/1984 | Yoshino et al. ................... 364/424.1 |
| 4,501,171 | 2/1985 | Müller et al. ......................... 74/866 |
| 4,503,734 | 3/1985 | Acker ..................................... 74/866 |
| 4,548,079 | 10/1985 | Klatt .............................. 364/424.1 X |
| 4,553,654 | 11/1985 | Bofinger et al. ................. 192/0.076 |
| 4,559,599 | 12/1985 | Habu et al. ....................... 364/424.1 |

Primary Examiner—Felix D. Gruber
Attorney, Agent, or Firm—J. O. Ray, Jr.

[57] ABSTRACT

A control apparatus is disclosed for a road vehicle, which contains a transmission control. The control apparatus includes, among other things, devices which recognize whether the vehicle is on the crest of a hill or in a valley, and whether the vehicle is travelling uphill or downhill over the crest of the hill or through a valley. For this purpose, the control apparatus includes a first devices which compares and calculates the difference between two stationary torques $M_{stat}$ calculated at different times which are necessary for nonaccelerating travel of the vehicle. In addition, the control apparatus contains a second devices which checks the mathematical sign of the difference $\Delta M_{stat}$. Finally, the control apparatus contains a third devices which compares the stationary torque $M_{stat}$ with a specified value a. By way of the output signals of the above-mentioned apparatus, a unilateral impedance element is controlled, which blocks the shift signals of a shift command transmitter in the operating conditions described above.

18 Claims, 2 Drawing Figures

FIG.2

TRANSMISSION CONTROL APPARATUS AND METHOD FOR VEHICLE TRAVELING UPHILL OR DOWNHILL

BACKGROUND OF THE INVENTION

The present invention relates in general to a transmission control apparatus and, more specifically, to commercial utility vehicles equipped with a manual transmission which varies the speed in stages, although the invention also offers advantages for such commercial vehicles that are equipped with automatic transmissions.

With automatic transmissions, auxiliary shifts or shift commands are being increasingly used in today's commercial motor vehicles. The required shift signals for these automatic transmissions are determined primarily on the basis of various conditions inside the vehicle. In hilly areas of a country, in particular, there are a number of increased problems associated with producing meaningful shift signals for such transmissions, and such problems are most specifically encountered on changing road grades.

When, for example, a vehicle is travelling uphill over the crest of a hill, it is possible then, because of the decreasing slope, that the vehicle will continue to accelerate with the same amount of drive power. Furthermore, on account of the increasing speed of the motor, a criterion for shifting the transmission into a higher gear will soon be reached. But, in such a situation, it may be inappropriate to shift to the higher gear, because behind the crest of the hill there will normally be a descending slope, and then the new higher gear may be inappropriate on account of excessive speed, and the transmission must then be downshifted in such commercial vehicles to obtain the braking effect of the motor.

Quite similar problems will likewise occur when a commercial vehicle is travelling downward over the crest of a hill. Here too, is a situation where it would be inappropriate to shift the transmission into a higher gear, as long as the slope continues to increase, because again, the beneficial braking effect of the motor would thereby be decreased.

If, for example, the vehicle is travelling through a valley, than, when reaching a downhill grade, it is also inappropriate to shift the transmission too soon to a higher gear, because the driver will usually want to take advantage of the power of the motor to attain even higher speeds to gain some additional momentum for climbing the subsequent hill. Specifically too when an uphill stretch of a valley is being negotiated it is important not to shift the transmission to a higher gear prematurely because the slope of the roadway can become so great that the required drive torque cannot, at a somewhat later point, be brought into a higher gear and then it will become necessary for the driver to downshift the transmission once again.

The present invention teaches an apparatus to automatically determine and control an appropriate shift point in an over-the-road vehicle transmission control mechanism. The shift point control apparatus comprises a differentiating means connected to the transmission control mechanism for substantially continuously determining a difference in a constant speed drive torque on such vehicle motor and for generating a signal value that is representative of a difference in the constant speed drive torque of such vehicle motor.

A comparator means is provided which is connected to receive the signal value representative of a difference in the constant speed drive torque for comparing this signal value with a predetermined value to determine both an increasing gradient and a decreasing gradient in a roadway and for generating at least one of a positive and a negative signal value that will be representative of an increasing gradient and an opposite sign signal value that will be representative of a decreasing gradient.

A verifying means is also provided which is connected to the transmission control mechanism for verifying the increasing and decreasing roadway gradients.

OBJECTS OF THE INVENTION

It is, therefore, one of the principle objects of the present invention to provide a vehicle transmission shift point control apparatus having the capability of automatically determining when such vehicle is travelling in either an uphill or downhill direction.

Another object of the present invention is to provide a transmission shift point control apparatus which can also recognize special roadway gradient conditions; such as, crest of hill uphill, crest of hill downhill, valley uphill, and valley downhill.

Still another object of the present invention is to provide a transmission shift point control apparatus which, prior to allowing a gear shift in such transmission, will verify roadway conditions.

These and various other objects and advantages of the present invention will become more apparent to those persons skilled in the transmission control art from the following more detailed description when taken in conjunction with the attached drawings and the appended claims.

BRIEF DESCRIPTION OF THE INVENTION

Prior to proceeding to the description of the invention, it is helpful to understand that the problem addressed by the invention is to create certain criteria by means of which the operating conditions of the type described above can be recognized with a significant degree of confidence and corresponding signals can be given to control the vehicle drive components, i.e., the motor, the clutch and the transmission.

A special advantage of the invention lies in the fact that the conditions "crest of hill uphill", "crest of hill downhill", "valley uphill" and "valley downhill" can be individually identified with confidence, so that the corresponding signals can be accurately evaluated in recognition circuits as a function of the external circumstances.

The vehicle weight required for evaluation may be determined in the manner suggested by assignee's co-pending U.S. patent application, Ser. No. 557,789, filed Dec. 5, 1983, now U.S. Pat. No. 4,548.079 and also incorporated herein by reference as to its teachings, since that method economically gives sufficient precision. The vehicle weight can also be measured directly, however.

The constant speed or stationary drive torque referred to hereinafter can be determined according to assignee's copending U.S. patent application, Ser. No. 590,247, filed on Mar. 16, 1984, now U.S. Pat. No. 4,630,508 and also incorporated herein by reference as to its teachings.

The invention will now be explained in greater detail below on the basis of an example which is illustrated in the drawings.

Figure 1:
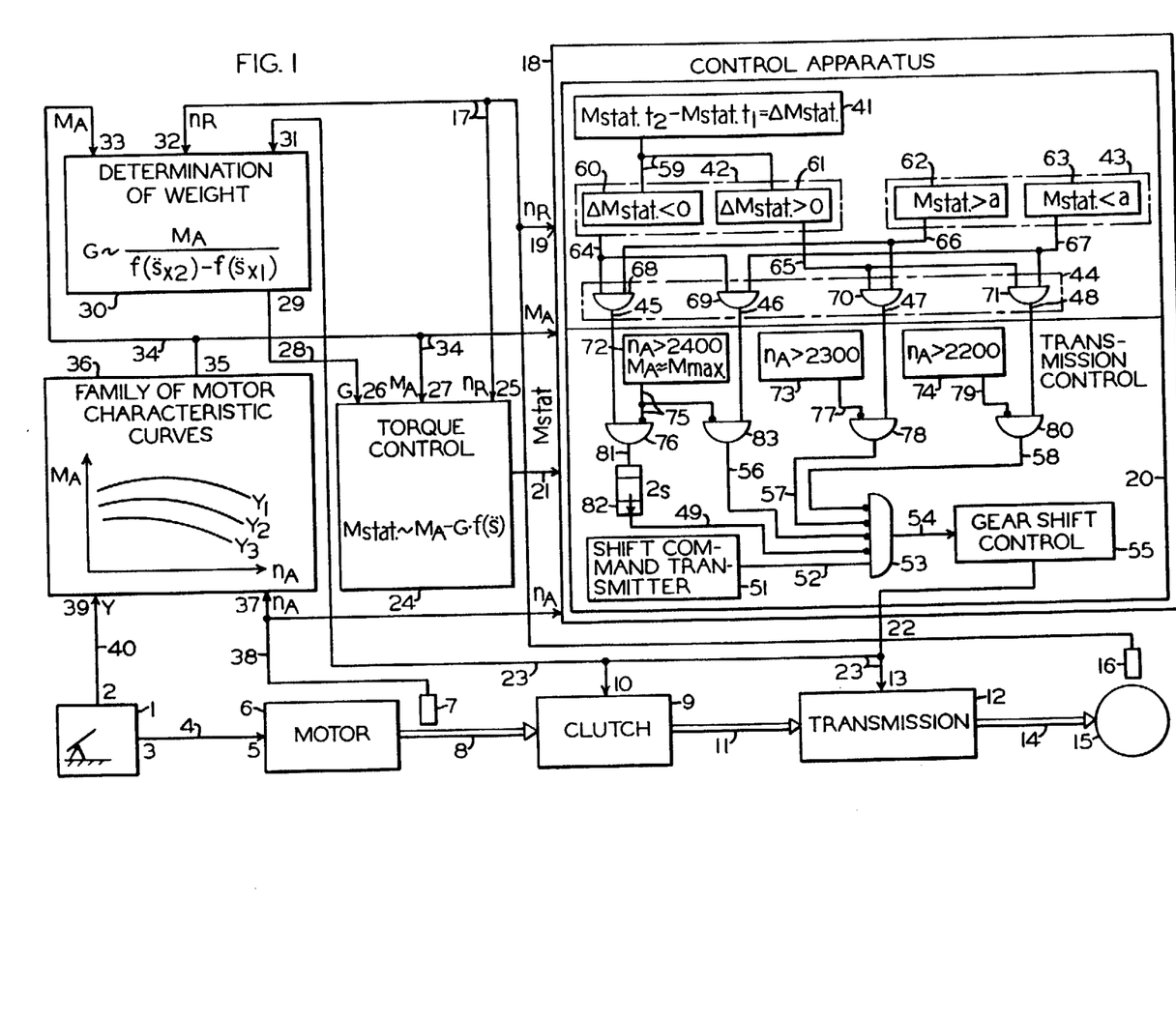
FIG. 1 is a schematic representation of the major components of a motor vehicle driven by a drive motor and which incorporates the presently preferred embodiment of the invention.

As shown in FIG. 1, the drive motor is preferably an internal combustion motor 6. The fuel feed to the motor 6 can be controlled by means of a transmitter, such as, a gas pedal 1. By means of a shaft 8, the motor 6 is connected with a friction clutch 9 which, in turn, is connected by means of a shaft 11 with a transmission 12. For the purpose of the present invention, transmission 12 may be either manual or automatic.

The transmission 12 drives an axle 14 which, in turn, drives the driven wheels of the motor vehicle. For the sake of simplicity, only one wheel 15 of the vehicle is illustrated.

The transmitter 1 for the control of the amount of fuel fed to the motor 6 has a signal output 3, which is connected by means of a signal or fuel line 4 with a signal or fuel input 5 of the motor 6. The transmitter 1 is also equipped with an apparatus which represents the position of the transmitter 1 as the signal value y. This signal value y can be called up and transmitted from a signal output 2 of the transmitter 1. In the simplest case, the transmitter 1 contains, as the control element for the amount of fuel fed to the motor 6, a generally standard mechanically-operated gas pedal.

The transmitter 1 can, however—as shown in the example—be designed as an electrical or electronic transmitter, whereby the motor 6 can be controlled by means of a control signal as is known in the art. The present invention is not to be limited to any particular method for feeding fuel to the motor 6.

The clutch 9, located between the drive-side shaft 8 and the drive-side shaft 11, can be, and preferably is, activated by means of a control signal from transmission control 18 by a signal over signal line 23 which can be conducted to a signal input 10 of the clutch 9.

The transmission 12 can also be controlled electrically, whereby a signal input 13 of the transmission 12 is used to receive the corresponding control signals also from line 23 for application of the desired or necessary speed. However, it should be understood by those skilled in the art that both the clutch 9 and the transmission 12 can, in the simplest case, be operated by purely mechanical means. In this case, the signal inputs 10 and 13 represent the connection of the clutch activation mechanism and transmission activation mechanisms with the corresponding activation apparatus for the clutch 9 and the transmission 12.

In the torque control apparatus 24, a stationary or constant speed drive torque $M_{stat}$ is determined in such a manner that the difference between the actual instantaneous drive torque $M_A$ applied by the motor 6 and such a mathematical value is determined, which is the product of the weight G of the vehicle and the instantaneous acceleration characteristic of the vehicle. The stationary drive torque $M_{stat}$ is the torque which would be necessary for the nonaccelerating drive of the vehicle. To be able to calculate the above-mentioned difference, the converted instantaneous drive moment $M_A$ of the motor 6 via a signal input 27, the weight G of the vehicle via a signal input 26, and the rotational speed $n_R$ of the driven wheel 15 via a signal input 25 are conducted to the torque control apparatus 24.

The signal input 27 of the torque control apparatus 24 is connected by means of a line 34 to the signal output 35 of a motor family of curves of motor characteristics memory 36, which makes available to the above-mentioned signal output 35, a signal corresponding to the instantaneous drive torque $M_A$ of the motor 6.

The signal input 26 of the torque control apparatus 24 is connected via a signal line 28 to a weight determination means 30, which determines the weight G of the vehicle. At a signal output 29 of the weight determination means 30, there is a signal value available which corresponds to the calculated weight G of the vehicle.

The signal input 25 of the torque control apparatus 24 is finally connected by means of a signal line 17 with an impulse transmitter 16 for the measurement of the rotational speed $n_R$ of the wheel 15. In the torque control apparatus 24, by differentiation from the temporal curve of the rotational speed $n_R$ of the wheel 15, the acceleration value $\ddot{s}$ of the vehicle is calculated.

The instantaneous drive torque $M_A$ of the motor 6 is determined from a family of curves of motor characteristics 36, which contains the dependence of the following values: instantaneous drive torque $M_A$ of the motor 6, rotational speed $n_A$ of the motor 6, and position y of the transmitter (gas pedal) 1. In the illustrated example, the memory 36 contains curves for three different values (y1, y2, y3) of the position y of the transmitter 1, one unique curve each for the dependence of the instantaneous drive torque $M_A$ on the rotation speed $n_A$.

By "family of motor characteristic curves", as used in this application, we also mean those families of curves which indirectly describe the operating condition of the motor, e.g., a family of curves which includes the dependence of the drive torque $M_A$, speed of rotation $n_A$, and the fuel injection time.

In addition, "torques", as used in this application, also means drive characteristics in general, e.g., power and comparable values, which include the drive torques as only one of several operands.

The position y of the transmitter 1 is conducted to a signal input 39 of the memory 36 via a signal line 40 which, as shown, has been connected to the signal output 2 of the transmitter 1. The speed of rotation $n_A$ of the motor 6 is determined by means of a sensor 7 which samples the shaft 8, and an impulse signal is conducted via a signal line 38 to a signal input 37 of the memory 36. The motor family of characteristic curves memory 36 is designed so that it makes available for each value pair $y/n_a$ the instantaneous drive torque $M_A$ at its signal output 35. The motor torque $M_A$ can also be measured directly with suitable sensors. The speed of rotation $n_A$ of the motor 6 can also be calculated from the speed of rotation $n_R$ of the wheel 15, if the proper translation ratio of the transmission 12 is taken into consideration.

In the weight determination means 30 for the determination of the weight G of the vehicle, the ratio between the instantaneous drive torque $M_A$ of the motor 6 and a difference between two operands is formed, whereby the above-mentioned operands always contain an acceleration value corresponding to the acceleration of the vehicle. These two acceleration values $\ddot{s}_{x2}$ and $\ddot{s}_{x1}$ are determined at different times, whereby the one acceleration value is preferably determined at a time in which the vehicle is not being driven or is between gears. In this nondriven status, the vehicle is neither significantly accelerated or decelerated.

To be able to carry out the above-mentioned calculation operation, the instantaneous drive torque $M_A$ of the motor is conducted to the weight determination means 30 via the signal line 34 and a signal input 33. The temporal curve of the speed of rotation $n_R$ of the driven wheel 15 necessary for the formation of the acceleration values $\ddot{s}_{x2}$ and $\ddot{s}_{x1}$ is conducted via the signal line 17 to a signal input 32 of the weight determination means 30. Via the signal lines 23, then, a signal input 31 of the weight determination means 30 is informed of the time at which the clutch 9 is open or disengaged. Thus, a distinction can be made between such times, in which the vehicle is driven by the motor 6 and such times in which the vehicle is not driven by the motor 6. At these different times, moreover, the acceleration values $\ddot{s}_{x2}$ $\ddot{s}_{x1}$ are measured and determined.

The general formula for the determination of the vehicle weight G reads:

$$G = \frac{M_{A1} - M_{A2}}{f(\ddot{s}_{x1}) - f(\ddot{s}_{x2})}$$

Values with Index 1 are determined at instant 1, and values with Index 2 a instant 2.

Aside from the special case $M_A=0$ described above, which is valid for the shift pause, the special case $f(\ddot{s}_{x2})=0$ can also be evaluated. This applies for an unaccelerated travel mode of the vehicle.

The above equation can naturally also be evaluated generally, without waiting for the special cases. In doing so, care must always be taken that the two required measurements are not separated by too great a period of time. But in order to get a sufficient precision for the weight G values of the vehicle, the difference of the motor 6 drive torques $M_{A1}$ and $M_{A2}$ should be selected so that it is as large as possible.

The weight determination means 30 can also be designed so that different determined weight G values are used for the formation of an average for the weight G values, and that the average value of the weight G values determined in this manner does not exceed a predetermined change.

To make sure that, even if a sufficiently precise value fo the weight G is not available in the weight determination means 30, e.g., because the vehicle has not been travelling long enough, a usable value for the stationary drive torque $M_{stat}$ can be determined in the torque control apparatus 24; it is advantageous, instead of the weight G values determined by the weight determination means 30, to initially use an average weight $G_0$, which can correspond, for example, to a half-loaded vehicle.

For a more accurate determination and calculation of the weight G, it is advantageous to use a microcomputer provided in the weight determination means 30 by means of which, in particular, the time-dependent calculation processes regarding the acceleration values $\ddot{s}_{x1}$ and $\ddot{s}_{x2}$ can be carried out in a simple and reliable manner.

To control the transmission 12, there is a schematically illustrated transmission control 20, which is a component of a control apparatus 18 for the control of the transmission 12 and other aggregates (not shown). The transmission control 18 receives the values of the rotation speed of the wheel $n_R$, the motor torque $M_A$, the stationary torque $M_{stat}$, and the motor speed $n_A$. In the simplest case, the transmission control 20 operates so that the transmission 12 is shifted automatically as a function of the speed of the vehicle, and therefore as a function of the speed of rotation $n_R$ of the driven wheels 15. To measure the speed of rotation $n_R$ of the driven wheel 15, there is a sensor 16 whose speed signal is conducted via the signal line 17 to a signal input 19 of the control apparatus 18. Via a signal output 22 and corresponding signal lines 23, the control apparatus 18 is connected with the signal input 13 of the transmission 12 and the signal input 10 of the clutch 9.

If, by means of the transmission control 20, as a function of the speed of the vehicle and considering predetermined selection criteria, a new gear is determined; the clutch 9 is activated by means of its signal input 10 and then, with a disengaged clutch 9, the transmission 12 is shifted by means of its signal input 13 by the transmission control 20. Then the clutch 9 is reengaged.

The control or activation of the clutch 9 and of the transmission 12 can take place mechanically by means of servomotors (not shown) of the transmission control 20.

It is also possible to include in the above-mentioned selection criteria, according to which a new gear is determined in the transmission control 20, a verification of whether the new operating point, after the selection of the new gear, would lie in the vicinity of the most efficient operating range.

To simplify the representation, the apparatus for the production of the shift signals is schematically represented as the shift command transmitter 51. The shift command transmitter 51 gives, via a line 52, a unilateral impedance 53 and a line 54, a shift command to a gearshift control means 55. The latter then controls, via the output 22, the auxiliary cylinder (not shown) for the gear-change process on the transmission 12 and the clutch 9 in the temporally-correct sequence. Instead of the gearshift control means 55, a shift-recommendation indication can also be given.

Figure 2:
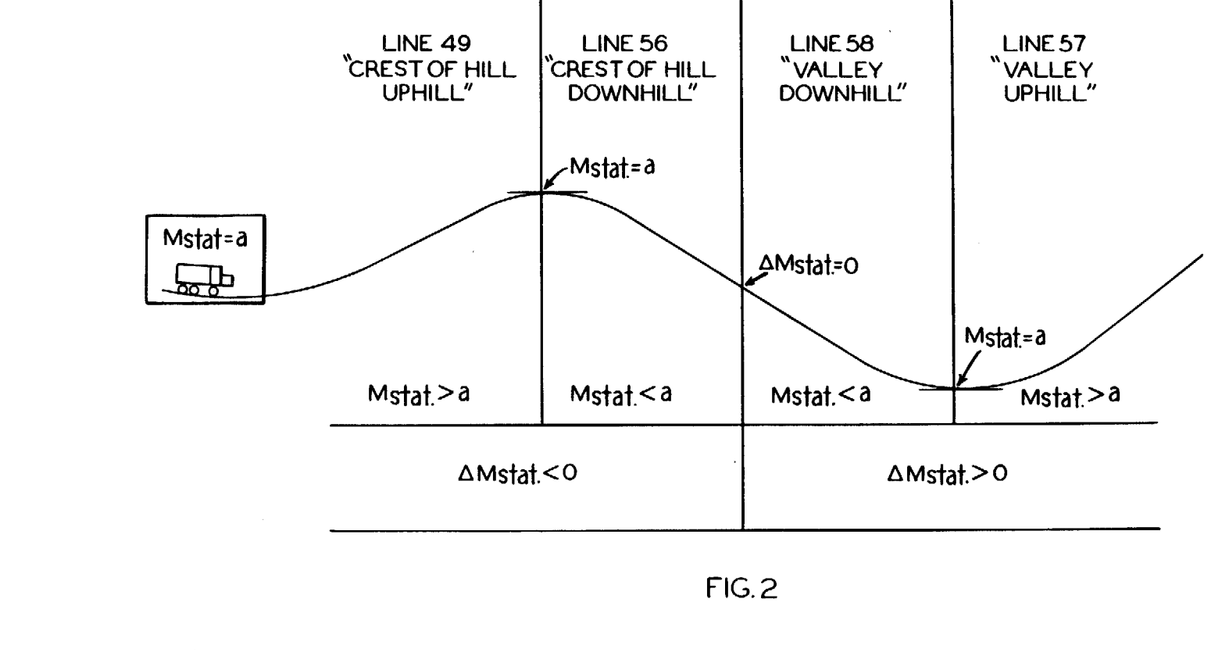
FIG. 2 is a diagrammatic representation of a roadway with a crest of a hill and a valley.

According to the invention, the shift signal given by the shift command transmitter 51, via the line 52, can also be blocked in the unilateral impedance 53, which is illustrated in FIG. 1 as an AND gate, under certain operating conditions. This is always the case when a signal occurs on one of the lines 49, 56, 57 or 58. The signals on lines 49, 56, 57 or 58 characterize the sequence according to the operating conditions "crest of hill uphill", "crest of hill downhill", "valley uphill" and "valley downhill", in which a shift to another gear is inappropriate (see FIG. 2).

The signal on line 49, "crest of hill uphill" arises as follows: First of all, it is determined whether the stationary or constant speed drive torque $M_{stat}$ changes, which can be one characteristic of a changing road slope. This occurs by the formation in a first differentiating apparatus 41 of the difference between two stationary drive torques $M_{stat}(t_1)$ and $M_{stat}(t_2)$, which were determined at two different times $t_1$ and $t_2$.

The formation of the difference of the stationary drive torques $M_{stat}$ can take place at intervals of between about 2 seconds and 10 seconds, and is carried out continuously during the operation of the vehicle. The value $\Delta M_{stat}$ is transmitted via lines 59 to a second apparatus 42 which determines the mathematical sign of the change in value $\Delta M_{stat}$. In place of the stationary torque $M_{stat}$, here and below, a value for the road slope p can also be used directly if this value is available in the vehicle.

By means of the second apparatus 42, it is determined whether the slope of the road is increasing or decreasing. By means of a criterion 60, it is determined whether the value $\Delta M_{stat}$ is less than zero. If this were the case, it would mean that the slope of the road was decreasing. This signal is forwarded via a line 64 to an AND element 68.

This signal is in itself a valuable status variable, which can advantageously be used for the control of various vehicle aggregates, e.g., of the motor 6. A refinement can be achieved by verifying whether the vehicle is actually travelling on an uphill gradient or on a downhill gradient.

This occurs in a third apparatus 43, which determines an upward or downward slope. In a criterion 62, a determination is made whether the stationary drive torque $M_{stat}$ is greater than a specified amount a. The amount (a) characterizes the normal travel resistance which occurs on the level. It can advantageously be varied, for example, by the speed of travel and other vehicle operating parameters. If $M_{stat}$ is greater than the predetermined amount (a), a signal is given to the AND element 68 via a line 66.

If both signals are present on the lines 64 and 66 at the input of the AND element 68, a signal is transmitted by the AND element 68 via a line 45 to a unilateral impedance 76. The signal in the line 45, therefore, occurs whenever the vehicle is travelling upward over the crest of a hill. This signal too, can be used very effectively for control of the vehicle. In the present case, however, it is processed for the special task of transmission 12 control and combined with other criteria.

In another criterion 72, it is examined whether the speed $n_A$ of the motor 6 is in the vicinity of the maximum motor 6 speed, which for a Diesel motor for utility vehicles is approximately $n_A = 2400$ rpm, and whether the motor 6 is simultaneously being operated with maximum power or maximum torque. From this, the conclusion can then be drawn that the driver does not expect any difficult driving situations, such as a subsequent downhill stretch, and that a change in gears is possible. If the criterion 72 is therefore fulfilled, a corresponding signal is sent via a line 75 to an inverted input of the unilateral impedance element 76.

The signal on the line 45 ("crest of hill uphill") can therefore pass through the unilateral impedance element 76 if the criterion 72 is not fulfilled, i.e., if the motor 6 speed $n_A$ or the motor 6 torque is low. The signal in the output line 81 of the unilateral impedance element 76 passes a time function element 82 with a delay of approximately 2 seconds, and travels via a line 49 to the unilateral impedance 53. There, it blocks the shifting of the transmission 12 into another, higher gear.

If the crest of the hill is at an end, and the signal in the line 81 expires, then the time function element 82 extends the signal blocking a shift in the line 49 by the predetermined time of 2 seconds.

This is intended to prevent a shifting of the transmission 12 after the crest of a hill, because immediately thereafter, a downhill stretch can occur. In this case, it is undesirable to shift into a higher gear because that would decrease the braking effect of the motor 6.

In an altogether similar manner, the signal "crest of hill downhill" is determined, blocking the change of gears. For this purpose, the criterion 60 transmits a signal via the line 64 to another AND element 69.

In addition, a criterion 63 (downhill travel) transmits a signal via a line 67 to the AND element 69. If both signals are present, via a line 46, a signal characterizing the operating condition "crest of hill downhill" is transmitted to a unilateral impedance element 83. This can then pass through the unilateral impedance element 83 and, at the unilateral impedance element 53, block a gear change in the transmission 12 if the above-mentioned criterion 72 is not fulfilled.

The signal "valley uphill" blocking the transmission 12 gear change is also determined by checking in a criterion 61 whether $\Delta M_{stat}$ is greater than zero, indicating in this situation an increasing slope, and then a signal is emitted via a line 65 to an AND element 70. Furthermore, the criterion 62 must give a signal via the line 66 to the AND element 70 to produce a "valley uphill" signal in a line 47, which then, via a line 57 to the unilateral impedance 53 prevents an automatic gear change, if a criterion 73 ($n_A > 2300$) is not fulfilled (i.e., if the motor speed is not in the vicinity of the maximum motor speed).

Finally, the signal "valley downhill" which blocks a transmission 12 gear change is also produced if simultaneous signals are given by the criterion 61 via the line 65 and by the criterion 63 via the line 67 to an AND element 71, and the output signal of the AND element 71 is transmitted via a line 48 and a unilateral impedance 80 via a line 58 to the unilateral impedance 53. In accordance with a criterion 74 ($n_A > 2200$), the blocking signal is only transmitted on the line 58 if the speed $n_A$ is not in the vicinity of the maximum motor speed. The speeds indicated in the criteria 72, 73 and 74 are approximate values and can vary somewhat due to a number of circumstances.

In order not to take away all the driver's options, the transmission 12 control scheme can be designed so that the blocking signals described above are valid for an automatic shift or for a shift indication; the driver, however, can shift at any time, if the traffic situation requires him to do so.

Another possibility for the utilization of the signals derived for uphill and downhill travel is their use for control of the motor (not shown). Thus, the signals on the lines 45 to 48 can be used, for example, on a vehicle which is beginning to travel uphill ("valley uphill") to turn on one or more cylinders of the motor, which had previously been shut down for economic reasons. Conversely, in the "crest of hill downhill" status, cylinders can be shut down early. As with the determination of the weight and the drive torque, it is possible to use a computer to perform the functions of the control apparatus 18.

Although both the presently preferred and alternative embodiments of the invention have been shown and described, it will be obvious to those persons skilled in the art that other modifications and adaptations can be made without departing from the spirit and scope of the appended claims.

I claim:

1. An on vehicle apparatus to determine the grade of a roadway as such vehicle traverses such roadway, said apparatus comprises:
   (a) a means positioned on such vehicle for determining a constant speed drive torque ($M_{stat}$) of such vehicle and for generating a first signal value representative of $M_{stat}$; and
   (b) a means connected to receive said first signal for comparing said value of said first signal with a value that is substantially equal to an $M_{stat}$ of such vehicle on a substantially level roadway ($M_{stat=a}$), and for generating a second signal having a value that is representative of an uphill roadway grade when said value of $M_{stat}$ is greater than $M_{stat=a}$, and for generating a third signal having a value that is representative of a downhill roadway grade when said value of $M_{stat}$ is less than $M_{stat=a}$.

2. An on vehicle apparatus, according to claim 1, wherein said apparatus further comprises:
   a means connected to periodically sample at a first time and a second time said first signal for generating a fourth signal that is representative of an increasingly steeper slope in such roadway grade when said value of $M_{stat}$ sampled at said second time is greater than said value of $M_{stat}$ sampled at said first time, and for generating a fifth signal that is representative of such roadway grade approaching level when said value of $M_{stat}$ sampled at said first time is greater than said value of $M_{stat}$ sampled at said second time.

3. An on vehicle apparatus, according to claim 2, wherein said apparatus further comprises:
   (a) a means connected to receive said second signal and said fourth signal for generating a signal indicating such vehicle is approaching a crest of a hill uphill when both of said second and said fourth signals are simultaneously received;
   (b) a means connected to receive said third signal and said fourth signal for generating a signal indicating such vehicle is approaching a crest of a hill downhill when both of said third and said fourth signals are simultaneously received;
   (c) a means connected to receive said third signal and said fifth signal for generating a signal indicating such vehicle is approaching a valley downhill when both of said third and said fifth signals are simultaneously received; and
   (d) a means connected to receive said second signal and said fifth signal for generating a signal indicating such vehicle is approaching a valley uphill when both of said second and said fifth signals are simultaneously received.

4. An on vehicle apparatus, according to claim 1, wherein said apparatus further comprises:
   (a) a means connected to periodically receive at a first time and second time said $M_{stat}$ signal for generating a difference signal $\Delta M_{stat}$ having a value that is representative of a difference between said values of said first and said second $M_{stat}$ signals; and
   (b) a comparator means connected to receive said $M_{stat}$ signal for determining an arithmetic sign of said $\Delta M_{stat}$ value and for generating an output signal having corresponding positive and negative values.

5. An on vehicle apparatus, according to claim 4, wherein said apparatus further comprises:
   (a) a means connected to receive said second signal and said output signal for generating a crest of hill uphill signal in response to said second signal and said output signal having a negative value thereby indicating such vehicle is approaching said crest of a hill uphill;
   (b) a means connected to receive said third signal and said output signal for generating a crest of hill downhill signal in response to said third signal and said output signal having a negative value thereby indicating such vehicle is approaching said crest of a hill downhill;
   (c) a means connected to receive said third signal and said output signal for generating a signal in response to said third signal and said output signal having a positive value thereby such vehicle is approaching a valley downhill; and
   (d) a means connected to receive said second signal and said output signal for generating a signal in response to said second signal and said output signal having a positive value thereby indicating such vehicle is approaching a valley uphill.

6. An on vehicle apparatus, according to claim 1, wherein said means for generating said first signal comprises:
   (a) a means for providing a signal having a value that is representative of a momentary drive torque of such vehicle engine;
   (b) a means for providing a signal having a value that is representative of a weight of such vehicle;
   (c) a means for providing a signal having a value that is representative of an acceleration of such vehicle at a preselected time and under preselected driving conditions; and
   (d) a means for generating a signal having a value representative of a constant speed drive torque of such vehicle engine, said constant speed drive torque signal generating means connected to receive said value of said momentary drive torque signal, said value of said signal representative of said weight of such vehicle, and said value of said signal representative of said acceleration of such vehicle, said constant speed torque signal generating means determining said constant speed drive torque by subtracting a product of said weight representative signal value and said acceleration representative signal value from said value of said momentary drive torque representative signal and generating said signal value that is representative of said constant speed drive torque.

7. An on vehicle apparatus, according to claim 5, wherein said apparatus controls gearshift changes and further comprises:
   (a) a means for providing a signal having a value that is representative of a motor rotational speed that is about maximum;
   (b) a means for providing a signal that is representative of a motor rotational speed that is below maximum;
   (c) a means for providing a signal that is representative of a motor rotational speed that is substantially below maximum;
   (d) a blocking means connected to receive said signal representative of about maximum motor rotational speed and said signal indicating such vehicle is approaching a crest of hill uphill for generating a signal to block a shift into a higher gear when both signals are simultaneously received;
   (e) a blocking means connected to receive said signal representative of about maximum motor rotational speed and said signal indicating such vehicle is approaching a crest of hill downhill for generating a signal to block a shift into a new gear if said signal representative of about maximum motor rotational speed is not simultaneously present;
   (f) a blocking means connected to receive said signal representative of a below maximum motor rotational speed and said signal indicating such vehicle is approaching a valley uphill for generating a signal to block a shift to a new gear if said signal representative of a below maximum motor rotational speed is not simultaneously present; and (g) a blocking means connected to receive said signal representative of a substantially below maximum motor rotational speed and said signal indicating such vehicle is approaching a valley downhill for generating a signal to block a shift to a new gear if said signal representative of a substantially below maximum motor rotational speed is not simultaneously present.

8. An on vehicle apparatus, according to claim 7, wherein said blocking means are unilateral impedance elements.

9. An on vehicle apparatus, according to claim 7, wherein said apparatus further comprises:
   (a) a means for providing a shift signal; and
   (b) a blocking means connected to receive said shift signal and said blocking signals for generating a shift command signal when said blocking signals are not simultaneously present.

10. An on vehicle apparatus, according to claim 9, wherein said apparatus further comprises a gearshift control mechanism connected to receive said shift command for generating a signal to change gear.

11. A method for determining the grade of a roadway as a vehicle traverses such roadway, said method comprising the steps of:
   (a) generating a first signal having a value that is representative of a constant speed drive torque ($M_{stat}$) of such vehicle;
   (b) comparing said value of said signal generated in step (a) with a value that is substantially equal to an $M_{stat}$ of such vehicle on a substantially level roadway ($M_{stat=a}$);
   (c) generating a second signal having a value that is representative of an uphill roadway grade when said value of $M_{stat}$ is greater than $M_{stat=a}$;
   (d) generating a third signal having a value that is representative of a downhill roadway grade when said value $M_{stat}$ is less than $M_{stat=a}$;
   (e) inputting said second signal generated in step (c) and said third signal generated in step (d) into a transmission control of such vehicle; and
   (f) controlling appropriate gearshift changes in response to said second signal and said third signal inputted to said transmission control in step (e).

12. A method, according to claim 11, wherein said method includes the additional steps of:
   (a) sampling periodically at a first time and a second time said first signal;
   (b) generating a fourth signal that is representative of an increasingly steeper slope in such roadway grade when said value of $M_{stat}$ sampled at said second time is greater than said value of $M_{stat}$ sampled at said first time; and
   (c) generating a fifth signal that is representative of such roadway grade approaching level when said value of $M_{stat}$ sampled at said first time is greater than said value of $M_{stat}$ sampled at said second time.

13. A method, according to claim 12, wherein said method includes the additional steps of:
   (a) inputting said second signal and said fourth signal into a means for generating a signal indicating such vehicle is approaching a crest of a hill uphill when both of said second and said fourth signals are simultaneously inputted to said means;
   (b) inputting said third signal and said fourth signal into a means for generating a signal indicating such vehicle is approaching a crest of a hill downhill when both of said third and said fourth signals are simultaneously inputted to said means;
   (c) inputting said third signal and said fifth signal into a means for generating a signal indicating such vehicle is approaching a valley downhill when both of said third and said fifth signals are simultaneously inputted to said means; and
   (d) inputting said second signal and said fifth signal into a means for generating a signal indicating such vehicle is approaching a valley uphill when both of said second and said fifth signals are simultaneously inputted to said means.

14. A method, according to claim 11, wherein said method includes the additional steps of:
   (a) sampling periodically at a first time and second time said $M_{stat}$ signal;
   (b) generating a difference signal ($\Delta M_{stat}$) having a value that is representative of the difference between said values of said first and said second $M_{stat}$ signals;
   (c) comparing said $\Delta M_{stat}$ signals with zero;
   (d) determining an arithmetic sign of said $\Delta M_{stat}$ value;
   (e) generating an output signal having a positive value; and
   (f) generating an output signal having a negative value.

15. A method, according to claim 14, wherein said method includes the additional steps of:
   (a) inputting said second signal and said output signal having said negative value into a means for generating a signal indicating such vehicle is approaching a crest of a hill uphill when both of said signals are simultaneously inputted to said means;
   (b) inputting said third signal and said output signal having said negative value into a means for generating a signal indicating such vehicle is approaching a crest of a hill downhill when both of said signals are simultaneously inputted to said means;
   (c) inputting said third signal and said output signal having said positive value into a means for generating a signal indicating such vehicle is approaching a valley downhill when both of said signals are simultaneously inputted to said means; and
   (d) inputting said second signal and said output signal having said positive value into a means for generating a signal indicating such vehicle is approaching a valley uphill when both of said signals are simultaneously inputted to said means.

16. A method, according to claim 15, wherein said method includes the additional steps of:
   (a) providing a signal that is representative of a motor rotational speed that is about maximum;
   (b) providing a signal that is representative of a motor rotational speed that is below maximum;
   (c) providing a signal that is representative of a motor rotational speed that is substantially below maximum;
   (d) inputting said signal representative of about maximum motor rotational speed and said signal indicating such vehicle is approaching the crest of hill uphill into a means for generating a signal to block a shift into a higher gear when both signals are simultaneously inputted to said means;
   (e) inputting said signal representative of about maximum motor rotational speed and said signal indicating such vehicle is approaching the crest of hill downhill into a means for generating a signal to block a shift into a new gear if said signal representative of about maximum motor rotational speed is not simultaneously inputted to said means;
(f) inputting said signal representative of a below maximum motor rotational speed and said signal indicating such vehicle is approaching the valley uphill into a means for generating a signal to block a shift to a new gear if said signal representative of a below maximum motor rotational speed is not simultaneously inputted to said means; and
(g) inputting said signal representative of a substantially below maximum motor rotational speed and said signal indicating such vehicle is approaching the valley downhill into a means for generating a signal to block a shift to a new gear if said signal representative of a substantially below maximum motor rotational speed is not simultaneously inputted to said means.

17. A method, according to claim 16, wherein said method includes the additional steps of:
    (a) providing a shift signal; and
    (b) inputting said shift signal and said blocking signals into a means for generating a shift command signal when said blocking signals are not simultaneously inputted to said means.

18. A method, according to claim 17, wherein said method includes the additional step of:
    generating a signal to change gear from said shift command signal.

* * * * *

UNITED STATES PATENT OFFICE
CERTIFICATE OF CORRECTION

PATENT NO. : 4,713,764
DATED : December 15, 1987
INVENTOR(S) : Alfred Klatt

It is certified that error appears in the above—identified patent and that said Letters Patent are hereby corrected as shown below:

Column 9, line 48, delete "$M_{stat}$" and insert -- $\Delta M_{stat}$ --

Signed and Sealed this

Fifth Day of July, 1988

Attest:

DONALD J. QUIGG

*Attesting Officer*  *Commissioner of Patents and Trademarks*